(12) United States Patent
Blair et al.

(10) Patent No.: US 8,623,979 B2
(45) Date of Patent: *Jan. 7, 2014

(54) CEMENT DISPERSANT AND METHODS OF MAKING AND USING THE SAME

(75) Inventors: Keith A. Blair, Pennsburg, PA (US); Arpad Savoly, Martinsville, NJ (US); Bennie Veal, Rome, GA (US)

(73) Assignee: GEO Speciality Chemicals, Inc., Cleveland, OH (US)

( * ) Notice: Subject to any disclaimer, the term of this patent is extended or adjusted under 35 U.S.C. 154(b) by 1084 days.

This patent is subject to a terminal disclaimer.

(21) Appl. No.: 11/835,441

(22) Filed: Aug. 8, 2007

(65) Prior Publication Data

US 2007/0270547 A1 Nov. 22, 2007

Related U.S. Application Data

(60) Division of application No. 10/874,502, filed on Jun. 23, 2004, now Pat. No. 7,271,214, which is a continuation-in-part of application No. 10/602,405, filed on Jun. 23, 2003, now Pat. No. 6,869,998.

(51) Int. Cl.
*C08F 22/20* (2006.01)
*C08F 20/10* (2006.01)
*C08F 16/02* (2006.01)
*C08F 16/00* (2006.01)

(52) U.S. Cl.
USPC ........ 526/328.5; 526/221; 526/222; 526/223; 524/556; 524/5

(58) Field of Classification Search
USPC ............ 526/221, 222, 223, 328.5; 524/5, 556
See application file for complete search history.

(56) References Cited

U.S. PATENT DOCUMENTS

| | | | |
|---|---|---|---|
| 4,457,762 A | 7/1984 | Papalos et al. | |
| 4,457,874 A | 7/1984 | Papalos et al. | |
| 4,479,826 A | 10/1984 | Papalos et al. | |
| 4,652,621 A | 3/1987 | Kadono et al. | |
| 4,674,574 A | 6/1987 | Savoly et al. | |
| 4,711,731 A | 12/1987 | Garvey et al. | |
| 4,741,843 A | 5/1988 | Garvey et al. | |
| 4,744,795 A | 5/1988 | Savoly et al. | |
| 4,814,389 A | 3/1989 | Garvey et al. | |
| 4,870,120 A | 9/1989 | Tsubakimoto et al. | |
| 5,158,612 A | 10/1992 | Savoly et al. | |
| 5,180,498 A * | 1/1993 | Chen et al. | 210/697 |
| 5,714,001 A | 2/1998 | Savoly et al. | |
| 5,753,744 A | 5/1998 | Darwin et al. | |
| 5,798,425 A | 8/1998 | Albrecht et al. | |
| 5,866,013 A | 2/1999 | Kessler et al. | |
| 6,140,440 A * | 10/2000 | Kinoshita et al. | 526/318.4 |
| 6,174,980 B1 | 1/2001 | Hirata et al. | |
| 6,176,921 B1 | 1/2001 | Kinoshita et al. | |
| 6,239,241 B1 | 5/2001 | Yamato et al. | |
| 6,264,739 B1 | 7/2001 | Yamato et al. | |
| 6,444,747 B1 | 9/2002 | Chen et al. | |
| 6,451,881 B1 | 9/2002 | Vickers, Jr. et al. | |
| 6,454,850 B2 | 9/2002 | Yamashita et al. | |
| 6,462,014 B1 | 10/2002 | Johnson et al. | |
| 6,486,260 B1 | 11/2002 | Yuasa et al. | |
| 6,548,589 B2 * | 4/2003 | Widmer et al. | 524/457 |
| 6,673,885 B1 * | 1/2004 | Shibata et al. | 526/318.41 |
| 6,727,315 B2 * | 4/2004 | Yamamoto et al. | 524/558 |
| 6,864,337 B2 * | 3/2005 | Yuasa et al. | 526/312 |
| 6,869,998 B2 * | 3/2005 | Bair et al. | 524/556 |
| 7,271,214 B2 | 9/2007 | Bair et al. | |
| 2003/0052303 A1 * | 3/2003 | Buentello et al. | 252/175 |

OTHER PUBLICATIONS

Supplementary European Search Report for EP 04755931 dated May 23, 2006, three pages.

* cited by examiner

*Primary Examiner* — Satya Sastri
(74) *Attorney, Agent, or Firm* — Rankin, Hill & Clark LLP

(57) ABSTRACT

The present invention relates to cement dispersant that is a copolymerization product of a first monomer (A) comprising a carboxylic acid, a second monomer (B) comprising an alkoxylated allyl alcohol sulfate, and, optionally, a third monomer (C) comprising an alkoxylated allyl alcohol. The cement dispersant according to the invention provides improved slump life properties and water reduction properties in cement admixtures.

9 Claims, No Drawings

US 8,623,979 B2

CEMENT DISPERSANT AND METHODS OF MAKING AND USING THE SAME

CROSS-REFERENCE TO RELATED APPLICATION

This application is a divisional of commonly owned application Ser. No. 10/874,502, filed Jun. 23, 2004, now U.S. Pat. No. 7,271,214, which is a continuation-in-part of application Ser. No. 10/602,405, filed Jun. 23, 2003, now U.S. Pat. No. 6,869,998, all of which are hereby incorporated herein by reference for all purposes.

BACKGROUND OF THE INVENTION

1. Field of Invention

The present invention relates to a cement dispersant and methods of making and using the same.

2. Description of Related Art

Cement dispersants are often added to cementitious compositions such as Portland cement, concrete other hydraulic cement compositions (hereinafter collectively "cement") to improve the workability or slump properties of the cement, to reduce the amount of water necessary to obtain good workability, which improves the strength of the resulting cured cement. Dispersants, which are also sometimes referred to as fluidity modifiers or slump modifiers, also help control the hardening and curing time of the cement.

Cement disspersants have conventionally been based on polymers and copolymers of naphthalene, aminosulfonic acids and polycarboxylic acids. Although cement dispersants of this type do improve the workability of cement when used properly, slump loss still remains a persistent problem in the field. Unexpected delays in delivering cement to construction sites and/or changes in ambient temperatures can negatively impact the quality of the cement and decrease the slump. There exists a need for a cement dispersant that provides improves slump life properties and water reduction properties.

BRIEF SUMMARY OF THE INVENTION

The present invention provides a dispersant for use in cementitious compositions that provides improved slump life properties and water reduction properties. The dispersant according to the invention comprises a copolymerization product of a first monomer (A) comprising a carboxylic acid such as, for example, acrylic acid, a second monomer (B) comprising an alkoxylated allyl alcohol sulfate such as, for example, an allyloxypolyethyleneglycol ammonium sulfate, and, optionally, a third monomer (C) comprising an alkoxylated allyl alcohol.

The present invention also provides: (1) a method of improving the slump properties of cement comprising dispersing into an admixture comprising cement and water a dispersant comprising a copolymerization product of a first monomer (A) comprising a carboxylic acid, a second monomer (B) comprising an alkoxylated allyl alcohol sulfate, and, optionally, a third monomer (C) comprising an alkoxylated allyl alcohol; (2) a method of forming a cement dispersaht comprising copolymerizing a first monomer (A) comprising a carboxylic acid, a second monomer (B) comprising an alkoxylated allyl alcohol sulfate, and, optionally, a third monomer (C) comprising an alkoxylated allyl alcohol to form a copolymerization product; and (3) a cement admixture comprising water, cement and a copolymerization product of a first monomer (A) comprising a carboxylic acid, a second monomer (B) comprising an alkoxylated allyl alcohol sulfate, and, optionally, a third monomer (C) comprising an alkoxylated allyl alcohol.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

The cement dispersant according to the present invention comprises a copolymerization product of a first monomer (A) comprising a carboxylic acid, a second monomer (B) comprising an alkoxylated allyl alcohol sulfate, and, optionally, a third monomer (C) comprising an alkoxylated allyl alcohol. The polymerization of the monomers into a copolymerization product is preferably accomplished using conventional solution, precipitation or emulsion polymerization techniques. Conventional polymerization initiators such as azo compounds, persulfates, peroxides, UV light, and the like may be used. Chain transfer agents such as alcohols (preferably isopropanol), amines, hypophosphites or mercapto compounds may be used to regulate or control-the molecular weight of the copolymerization product. The backbone of the copolymerization product preferably comprises a random combination of the repeat unit remaining after polymerization of the monomers. The resulting copolymerization product may be isolated by common isolation techniques including precipitation isolation and the like. If polymerization is carried out in water, the copolymerization product may simply be used in its aqueous solution.

The first monomer (A) used to form the copolymerization product according to the invention preferably comprises a carboxylic acid, amido carboxylic acid, C1-C6 alkyl ester of carboxylic acid, C1-C6 alkyl ester of amido carboxylic acid, hydroxylated C1-C6 alkyl ester of carboxylic acid, or a hydroxylated C1-C6 alkyl ester of amido carboxylic acid. Particularly preferred carboxylic acids for use as first monomer (A) include acrylic acid, methacrylic acid, acrylamide, maleic acid, maleic anhydride, fumaric acid, itaconic acid, 2-acrylamido-2-methylpropanesulfonic acid, and water-soluble salts thereof.

The second monomer (B) used to form the copolymerization product according to the invention preferably comprises an alkoxylated allyl alcohol sulfate according to Formula (I) below:

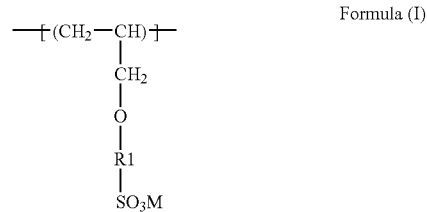

Formula (I)

Where "R1" is $(CH_2-CH_2-O)_n$, $(CH_2-CH(CH_3)-O)$ n, or a mixture of both and "n" is an integer from about 1 to about 100; and "M" is sodium, potassium, calcium, ammonium or an organic amine such as triethylamine, morpholine, and the like. As noted in Formula (I) above, the second monomer (B) has a terminal sulfate group covalently bonded through an oxygen atom $[-C-O-S-O_3-]$, and thus is not a sulfonate, which has a terminal sulfate group covalently bonded directly to a carbon atom [—C—S—O₃—]. Monomer (B) can be prepared by ethoxylation, propoxylation or a combination of the ethoxylation and propoxylation of an allyl alcohol followed by an addition of sulfamic acid, which produces the monomer unit having a covalently bonded sulfate terminated end group bonded through an oxygen atom.

The optional third monomer (C) used to form the copolymerization product according to the invention preferably comprises an alkoxylated allyl alcohol according to Formula (II) below:

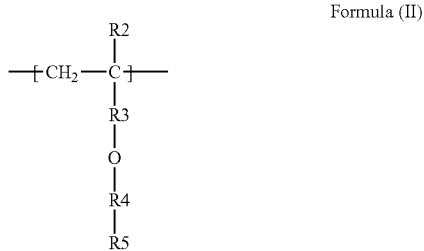

Formula (II)

Where "R2" is H or a lower (C1-C4) straight or branched alkyl chain; "R3" is CH₂ or C=O; "R4" is (CH₂—CH₂—O)m, (CH₂—CH(CH₃)—O)m, or a mixture of both and "m" is an integer from about 1 to about 150; and "R5" is H or a C1-C18 straight or branched alkyl chain. Third monomer (C) is referred to as polyethylene gylcol allyl ether (PEGAE) when "R2" and "R5" are H; "R3" is CH₂; and "R4" is (CH₂—CH₂—O). Third monomer (C) is referred to as polypropylene glycol allyl ether (PPGAE) when "R2" and "R5" are H; "R3" is CH₂; and "R4" is (CH₂—CH(CH₃)—O). Third monomer (C) is referred to as polyethyleneglycollprbpylene glycol ally ether (PEGPGAE) when "R2" and "R5" are H; "R3" is CH₂; and "R4" is (CH₂—CH₂—O—CH₂—CH(CH₃)—O). Third monomer (C) is referred to as hydroxyethyleneglycolmethylmethacrylate (HEME) when "R2" is CH₃; "R3" is C=O; "R4" is (CH₂—CH₂—O); and "R5" is H. Third monomer (C) is referred to as methoxyethyleneglycolmethylmethacrylate (MHEM) when "R2" is CH₃; "R3" is C=O; "R4" is (CH₂—CH₂—O); and "R5" is CH₃. It will be appreciated that "R5" can be sulfonated.

Preferably, the molar ratio of first monomer (A) to second monomer (B) to third monomer (C) in the copolymerization product is in a range of from about 1 to about 10 for first monomer (A), from about 1 to about 4 for second monomer (B), and from about 0 or 1 to about 10 for third monomer (C). In other words, the molar ratio of first monomer (A) to second monomer (B) to third monomer (C) in the copolymerization product is from about 1-10:1-4:0 or 1-10. More preferably, the molar ratio of first monomer (A) to second monomer (B) to third monomer (C) in the copolymerization product is in a range of from about 2.5 to about 6 for first monomer (A), from about 1 to about 2 for second monomer (B), and from about 0 or 1 to about 3 for third monomer (C) (or about 2.5-6:1-2:0 or 1-3).

The dispersant according to the invention can be added to freshly mixed cement to disperse and to adjust the Theological properties of the admixture. As noted above, throughout the instant specification and in the appended claims, the term "cement" refers to all cementitious materials including, for example, Portland cement, concrete and other hydraulic cementitious compositions. The addition of the dispersant to freshly mixed cement compositions improves, for example, the slump life of the admixture and also reduces the amount Of water needed to obtain desired slump properties. Typically, the dispersant is added into an aqueous cement mixture in an amount in a range of about 0.1 percent by weight to about 1.0 percent by weight, and more preferably in an amount in a range of from about 0.2 percent by weight to about 0.32 percent by weight.

It will be appreciated that although the dispersant according to the invention is primarily intended for use in cement compositions, it can also be used in other compositions where dispersants are used. Examples include powdered inorganic and organic substances, for example clays, porcelain slips, silicate meals, chalk, carbon black, powdered rock, pigments, talc, synthetic material powders and hydraulic binding agents. Also, the dispersant can be used in the oilfield industry for oil well cementing. Additionally, the polymers can be used in the gypsum industry as dispersants or water reducing agents. Further, these polymers can be used to disperse SBR and NBR emulsion rubbers during polymerization and processing of the rubber. The dispersants according to the invention also find utility in other applications such as, for example, in metal pre-treatment and cooling and boiler water treatment applications.

EXAMPLES

The following examples are intended only to illustrate the invention and should not be construed as imposing limitations upon the claims. Unless specified otherwise, all reagents and equipment used in the following examples can be obtained from Sigma Aldrich, Inc. (St. Louis, Mo.) and/or Fisher Scientific International, Inc. (Hanover Park, IL). The allyloxypolyethyleneglycol ammonium sulfate monomers used in the examples are available from Bimax, Inc. (Cockeysville, Md.), and the allyloxypolyethyleneglycol/propylene glycol ammonium sulfate monomers used in the examples are available both from Bimax, Inc. and from Rhodia, Inc., (Cranbury, N.J.). The abbreviations shown in Table I below are used throughout the Examples:

TABLE 1

| Abbreviation | Monomer | Comment |
| --- | --- | --- |
| AA | acrylic acid | — |
| MAA | methacrylic acid | — |
| APES-10 | ammonium allylpolyethoxy (10) sulphate | alkoxylated with an average of 10 moles of ethylene oxide |
| APES-20 | Ammonium allylpolyethoxy (20) sulphate | alkoxylated with an average of 20 moles of ethylene oxide |
| APES-50 | Ammonium allylpolyethoxy (50) sulphate | alkoxylated with an average of 50 moles of ethylene oxide |
| APE5-P5S | Ammonium allylpolyethoxy (5) polypropoxy (5) sulfate | alkoxylated with an average of 5 moles of ethylene oxide and 5 moles of propylene oxide |

TABLE 1-continued

| Abbreviation | Monomer | Comment |
|---|---|---|
| PEGAE-10 | polyethyleneglycol (10) allyl ether | alkoxylated with an average of 10 moles of ethylene oxide |
| PEGAE-20 | polyethyleneglycol (20) allyl ether | alkoxylated with an average of 20 moles of ethylene oxide |
| PEGAE-50 | polyethyleneglycol (50) allyl ether | alkoxylated with an average of 50 moles of ethylene oxide |
| PEGAE-60 | polyethyleneglycol (60) allyl ether | alkoxylated with an average of 60 moles of ethylene oxide |
| PEGAE-100 | polyethyleneglycol (100) allyl ether | alkoxylated with an average of 100 moles of ethylene oxide |
| MHEM16 | methoxypolyethylene glycol monomethacrylate | alkoxylated with an average of 16 moles of ethylene oxide |

Example 1

Sample 1

A suitable flask was equipped with a condenser, an addition funnel, a mechanical stirrer, a thermometer and a nitrogen sparger. The flask was charged with 46.3 g (.075 mole @95%) of APES-10 and 90 g of deionized water. 16.2 g (0.225 mole @99%) of AA was charged to a 20 cc syringe and placed on a syringe pump. 9.12 g of a 16.6% solution of sodium persulfate ("initiator solution") was charged to a separate syringe and placed on a separate syringe pump. The aqueous APES-10 solution was sparged with nitrogen and heated to 85° C. The AA and the initiator solution were pumped into to the aqueous APES-10 solution simultaneously over three hours. The resulting aqueous copolymer solution was heated for one more hour at 85° C. then cooled to room temperature. Caustic (50%) was then added to adjust the pH to 6.4. The resulting copolymerization product, acrylic acid/allyloxypolyethylene glycol sulfate ammonium salt ("AA/APES-10"), was in the form of a clear, light yellow solution. After diluting the solution to 25% solids by weight, a Brookfield viscosity of 31.7 cps was recorded. The physical properties for the AA/APES-10 copolymerization product were recorded in Table 2 below.

Samples 2-13

The same procedure and equipment used to produce Sample 1 was used to prepare the copolymerization products identified as Samples 2-13 in Table 2 below. The molar ratios of the monomers used to form the copolymerization products are also set forth in Table 2 below.

Sample 14

The same equipment used to produce Sample 1 was used to prepare an acrylic acid/allyloxypolyethyleneglycol sulfate ammonium salt/allyloxypolyethyleneglycol (AA/APES-10/PEGAE-10 terpolymer) copolymerization product. Specifically, 21.92 g (0.035 mole @95%) of APES-10 and 17.45 g (0.035 mole) of PEGAE-10 and 78.44 g of deionized water were charged to the flask. 15.14 g (0.21 mole) of AA was charged to a 20 cc syringe and placed on a syringe pump. 5.86 g of a 20% solution of sodium persulfate ("initiator solution") was charged to a separate syringe and placed on a separate syringe pump. The aqueous APES-10/PEGAE-10 solution was sparged with nitrogen and heated to 85° C. The AA and the initiator solution were pumped into to the aqueous APES-10/PEGAE-10 solution simultaneously over three hours. The resulting aqueous terpolymer solution was heated for one more hour at 85° C. then cooled to room temperature. Caustic (50%) was then added to adjust the pH to 5.3. The resulting copolymerization product, acrylic acid/allyloxypolyethylene glycol sulfate ammonium salt/allyloxypolyethyleneglycol glycol ("AA/APES-10/PEGAE-10"), was in the form of a clear, light yellow solution. After diluting the solution to 25% solids by weight, a Brookfield viscosity of 31.5 cps was recorded. The physical properties for the AA/APES-10/PEGAE-10 copolymerization product were recorded in Table 2 below.

Samples 15-26

The same procedure and equipment used to produce Sample 14 was used to prepare the copolymerization products identified as Samples 15-26 in Table 2 below. The molar ratios of the monomers used to form the copolymerization products are also set forth in Table 2 below.

TABLE 2

| Sample | Copolymerization Product | Monomer Mole Ratio | % Solids | Viscosity | pH |
|---|---|---|---|---|---|
| 1 | AA/APES-10 | 3/1 | 24.3 | 31.7 cps | 5.4 |
| 2 | AA/APES-10 | 3/1 | 24.1 | 21.8 cps | 5.8 |
| 3 | AA/APES-20 | 2.5/1 | 25.2 | 12.3 cps | 5.5 |
| 4 | AA/APES-20 | 3/1 | 23.7 | 18.7 cps | 5.2 |
| 5 | AA/APES-20 | 4/1 | 23.6 | 21.0 cps | 5.1 |
| 6 | AA/APES-20 | 5.6/1 | 25.6 | 65.9 cps | 5.9 |
| 7 | AA/APES-20 | 8.9/1 | 23.1 | 8850 cps | 6.4 |
| 8 | AA/APES-50 | 3/1 | 24.6 | 19.3 cps | 4.7 |
| 9 | AA/APES-50 | 3/1 | 24.6 | 14.8 cps | 4.6 |
| 10 | AA/APE5-P5S | 3/1 | 24.2 | 13.0 cps | 5.5 |
| 11 | AA/APAE5-P5S | 3/1 | 24.8 | 11.0 cps | 6.0 |
| 12 | MAA/APAE5-P5S | 3/1 | 25.2 | 10.6 cps | 6.4 |
| 13 | MAA/AA/APES-10 | 1.5/1.5/1 | 24.0 | 31.2 cps | 6.1 |
| 14 | AA/APES-10/PEGAE-10 | 3/0.5/0.5 | 23.8 | 31.5 cps | 5.4 |
| 15 | AA/APES-20/PEGAE-20 | 3/0.5/0.5 | 25.1 | 20.3 cps | 5.5 |
| 16 | AA/APES-50/PEGAE-50 | 3/0.5/0.5 | 24.6 | 16.5 cps | 4.9 |
| 17 | AA/APES-20/PEGAE-50 | 3/0.5/0.5 | 25.0 | 14.0 cps | 5.1 |
| 18 | AA/APES-20/PEGAE-20 | 3/0.27/0.5 | 23.7 | 19.0 cps | 6.0 |
| 19 | AA/APES-20/PEGAE-20 | 3/0.27/0.5 | 25.7 | 50.5 cps | 6.1 |
| 20 | AA/APES-20/PEGAE-60 | 3/0.5/0.5 | 24.9 | 18.3 cps | 5.2 |

TABLE 2-continued

| Sample | Copolymerization Product | Monomer Mole Ratio | % Solids | Viscosity | pH |
|---|---|---|---|---|---|
| 21 | AA/APES-20/PEGAE5-P5 | 3/0.5/0.5 | 24.8 | 14.2 cps | 5.5 |
| 22 | AA/APAE5-P5S/PEGAE-50 | 3/0.5/0.5 | 24.7 | 17.1 cps | 5.2 |
| 23 | AA/APES-20/PEGAE-100 | 3/0.5/0.5 | 40.2 | 86.3 cps | 6.0 |
| 24 | AA/MHEM-16/APES-20 | 3/0.5/0.5 | 24.4 | 19.7 cps | 6.6 |
| 25 | AA/APES-20/PEGAE5-P5 | 3/0.5/0.5 | 24.3 | 14.1 cps | 5.8 |
| 26 | AA/APES-20/PEGAE5-P5 | 3/0.5/0.5 | 24.84 | 14.2 cps | 5.5 |

Several of the samples produced in Example 1 were subjected to 13-C NMR testing. The spectra were characterized by a broad polyacrylic acid type backbone. Strong resonances at 61, 70 and 72 ppm correspond to the polyethylene glycol moiety and a broad carbonyl region (179-184 ppm). A very low level (<3%) of unreacted allylic monomer was detected in some of the samples.

Example 2

Each of the samples of dispersants produced in Example 1 was tested for slump efficacy using the Cement Mini-slump testing procedure known as the "Standard Test Method for Slump of Hydraulic Cement Concrete" ASTM C143-97, Vol. 04.02, which is hereby incorporated by reference in its entirety. Additional information regarding the Cement Mini-slump test is found in D. L. Kantro's, *Influence of Water-Reducing Admixtures on Properties of Cement Paste—A Miniature Slump Test*, Cement, Concrete and Aggregates, 2, (1980) pp. 95-102, the entire contents of which is hereby incorporated by reference. Specifically, 100 grams (g) of Type 1 Portland cement was added to a disposable beaker. 35 g water was added to the beaker and the cement and water was mixed for 30 seconds with a metal spatula to produce a slurry. 0.32 weight percent of each of the samples produced: in Example 1 was dosed via a disposable syringe into the cement slurry. The slurry was mixed for an additional 30 seconds. The cement slurry was poured into a mini-slump cone, which was sitting on a glass plate. The mini-slump cone was then filled to the top with the cement slurry and then the mini-slump cone was lifted quickly and evenly from the glass plate, allowing the cement slurry to flow onto the glass plate. The diameter of the cement slurry patty thus formed was measured. The measurement was the initial slump diameter. The material was returned to the disposable beaker, then re-mixed and measured every 30 minutes to monitor slump retention. The results of Mini-slump Testing using Samples 1-26 produced in Example 1 is shown in Table 3 below, where the term "Thick" means that the cement slurry thickened to such an extent that no meaningful slump data could be obtained.

TABLE 3

| | | Slump Diameter (cm) | | | | |
|---|---|---|---|---|---|---|
| Sample | Dispersant % | 0 min | 30 min | 60 min | 90 min | 120 min |
| 1 | 0.32 | 18.0 | 8.7 | Thick | Thick | Thick |
| 2 | 0.32 | 16.2 | 16.6 | 16.0 | 13.5 | 11.9 |
| 3 | 0.32 | not tested | — | — | — | — |
| 4 | 0.32 | 19.3 | 21.1 | 19.0 | 16.9 | 15.0 |
| 5 | 0.32 | 17.0 | 18.4 | 18.6 | 18.1 | 17.6 |
| 6 | 0.32 | Thick | Thick | Thick | Thick | Thick |
| 7 | 0.32 | 16.5 | Thick | Thick | Thick | Thick |
| 8 | 0.32 | 18.2 | 18.9 | 18.8 | 18.7 | 18.4 |
| 9 | 0.32 | 17.9 | 18.1 | 18.7 | 18.0 | 17.9 |
| 10 | 0.32 | 19.5 | 21.0 | 21.3 | 21.0 | 19.5 |
| 11 | 0.32 | 21.3 | 13.4 | 11.1 | 10.5 | 9.2 |
| 12 | 0.32 | 18.7 | Thick | Thick | Thick | Thick |
| 13 | 0.32 | 18.8 | 15.5 | 12.6 | 6.3 | Thick |
| 14 | 0.32 | 18.1 | 17.0 | 17.8 | 17.1 | 16.6 |
| 15 | 0.32 | 18.5 | 19.2 | 17.6 | 16.4 | 15.2 |
| 16 | 0.32 | 17.4 | 18.3 | 18.3 | 18.1 | 17.2 |
| 17 | 0.32 | 18.8 | 18.7 | 19.1 | 18.7 | 18.5 |
| 18 | 0.32 | 20.2 | 17.0 | 16.6 | 15.7 | 15.0 |
| 19 | 0.32 | 15.1 | 10.7 | Thick | Thick | Thick |
| 20 | 0.32 | 21.6 | 22.0 | 22.8 | 23.0 | 22.5 |
| 21 | 0.32 | 18.4 | 20.7 | 21.0 | 21.4 | 20.7 |
| 22 | 0.32 | 17.2 | 19.2 | 20.2 | 20.8 | 20.0 |
| 23 | 0.32 | 17.4 | 20.7 | 20.2 | 19.9 | 19.4 |
| 24 | 0.32 | 16.4 | 16.8 | 16.4 | 16.0 | 14.3 |
| 25 | 0.32 | 19.5 | 20.6 | 21.5 | 21.8 | 20.5 |
| 26 | 0.32 | 18.4 | 20.7 | 21.0 | 21.4 | 20.7 |

Example 3

Each of the samples of dispersants produced in Example 1 was tested for slump efficacy using the same procedure as in Example 2, except that 0.20 weight percent of each of the samples produced in Example 1 was dosed via a disposable syringe into the cement slurry. The results of Mini-slump Testing using Samples 1-26 produced in Example 1 is shown in Table 4 below.

TABLE 4

| | | Slump Diameter (cm) | | | | |
|---|---|---|---|---|---|---|
| Sample | Dispersant % | 0 min | 30 min | 60 min | 90 min | 120 min |
| 1 | 0.20 | 17.7 | Thick | Thick | Thick | Thick |
| 2 | 0.20 | 18.2 | Thick | Thick | Thick | Thick |
| 3 | 0.20 | 17.3 | 12.8 | 12.5 | 12.0 | 11.2 |
| 4 | 0.20 | 20.9 | 11.4 | Thick | Thick | Thick |
| 5 | 0.20 | 17.8 | 9.4 | Thick | Thick | Thick |
| 6 | 0.20 | Thick | Thick | Thick | Thick | Thick |
| 7 | 0.20 | 13.2 | Thick | Thick | Thick | Thick |
| 8 | 0.20 | 16.0 | 14.0 | 13.4 | 13.3 | 12.6 |
| 9 | 0.20 | 15.8 | 13.7 | 13.2 | 12.9 | 12.2 |
| 10 | 0.20 | 20.5 | 11.7 | 10.6 | 9.5 | 7.6 |
| 11 | 0.20 | 20.2 | Thick | Thick | Thick | Thick |
| 12 | 0.20 | 13.5 | Thick | Thick | Thick | Thick |
| 13 | 0.20 | 16.9 | Thick | Thick | Thick | Thick |
| 14 | 0.20 | 17.6 | Thick | Thick | Thick | Thick |
| 15 | 0.20 | 19.2 | 12.5 | 12.2 | 11.6 | 10.3 |
| 16 | 0.20 | 15.0 | 13.0 | 12.8 | 12.2 | 11.6 |
| 17 | 0.20 | 16.9 | 14.1 | 14.0 | 13.5 | 13.1 |
| 18 | 0.20 | 18.2 | 8.0 | Thick | Thick | Thick |
| 19 | 0.20 | 13.5 | Thick | Thick | Thick | Thick |
| 20 | 0.20 | 20.6 | 17.9 | 17.4 | 16.9 | 16.0 |
| 21 | 0.20 | 20.4 | 13.7 | 12.5 | 12.3 | 11.6 |
| 22 | 0.20 | 18.3 | 16.3 | 15.6 | 14.9 | 14.0 |
| 23 | 0.20 | 18.0 | 16.0 | 15.6 | 14.9 | 14.0 |
| 24 | 0.20 | 18.0 | 12.4 | 7.5 | Thick | — |
| 25 | 0.20 | 20.1 | 13.2 | 12.2 | 12.0 | 11.3 |
| 26 | 0.20 | 20.4 | 13.7 | 12.5 | 12.3 | 11.6 |

Comparative Example 4

To illustrate the relative efficacy of the dispersants produced in accordance with the invention with conventional dispersants, the Mini-slump Test was repeated using three different amounts of a conventional calcium naphthalene sulfonate condensate dispersant available from GEO Specialty Chemicals as DILOFLO® CA. The results of the comparative Mini-Slump Testing are shown in Table 5 below.

TABLE 5

| Sample | Dispersant % | Slump Diameter (cm) | | | | |
|---|---|---|---|---|---|---|
| | | 0 min | 30 min | 60 min | 90 min | 120 min |
| C1 | 0.32 | 17.0 | Thick | Thick | Thick | Thick |
| C2 | 0.35 | 16.6 | Thick | Thick | Thick | Thick |
| C3 | 0.70 | 19.0 | 19.2 | 18.5 | 16.6 | 14.6 |

Comparative Example 4 demonstrates that nearly two times as much of a conventional cement dispersant must be used in order to achieve the same slump properties as can be obtained with cement dispersants according to the present invention.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A dispersant composition for improving the slump properties of a cement admixture, the dispersant composition comprising a terpolymer comprised of a random combination of structural units (A), (B) and (C) remaining after polymerization, wherein:

(A) is one or more monomers having functional groups selected from the group consisting of carboxylic acids, amido carboxylic acids, C1-C6 alkyl esters of carboxylic acids, C1-C6 alkyl ester of amido carboxylic acids, hydroxylated C1-C6 alkyl esters of carboxylic acids, hydroxylated C1-C6 alkyl esters of amido carboxylic acids and sulfonic acids:

(B) is according to Formula (I):

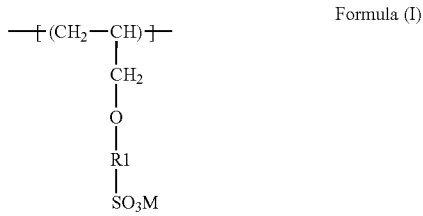

Formula (I)

where "R1" is $(CH_2-CH_2-O)n$ or $(CH_2-CH(CH_3)-O)n$ or a mixture of both and "n" is an integer ranging from about 1 to about 100; and "M" is sodium, potassium, calcium, ammonium or an organic amine; and (C) is according to Formula (II):

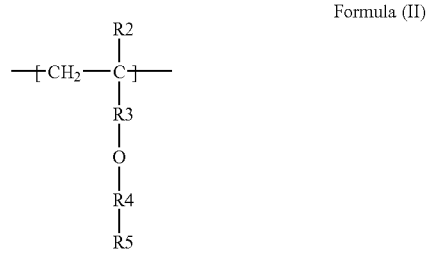

Formula (II)

where "R2" is H or a C1-C4 straight or branched alkyl chain; "R3" is $CH_2$ or $C=O$; "R4" is $(CH_2-CH_2-O)m$ or $(CH_2-CH(CH_3)-O)m$ or a mixture of both and "m" is an integer ranging from about 1 to about 150; and "R5" is H or a C1-C18 straight or branched alkyl chain.

2. The dispersant composition of claim 1, wherein (A) is one or more selected from the group consisting of acrylic acid, methacrylic acid, acrylamide, maleic acid, maleic anhydride, fumaric acid, itaconic acid, 2-acrylamido-2-methyl-propanesulfonic acid, and water-soluble salts thereof.

3. The dispersant composition of claim 1, wherein (B) comprises an allyl alcohol that has been ethoxylated, propoxylated, or both, followed by the addition of sulfamic acid to form an end terminal sulfate group that is covalently bonded through an oxygen atom.

4. The dispersant composition of claim 1, wherein (B) is an ammonium allylpolyethoxy sulfate alkoxylated with an average of up to about 100 moles of ethylene oxide.

5. The dispersant composition of claim 1, wherein (B) is an ammonium allylpolyethoxy sulfate alkoxylated with an average of up to about 50 moles of ethylene oxide.

6. The dispersant composition of claim 1, wherein (C) is one or more selected from the group consisting of polyethylene glycol allyl ether (PEGAE), polypropylene glycol allyl ether (PPGAE), polyethylene glycol/polypropylene glycol allyl ether (PEGPGAE), hydroxyethyene glycol methylmethacrylate (HEME), and methoxyethyene glycol methylnnethacrylate (MEME).

7. The dispersant composition of claim 1, wherein the molar ratio of (A) to (B) to (C) in the terpolymer is in a range of from about 1 to about 10 for (A), from about 1 to about 4 for (B), and from about 1 to about 10 for (C).

8. The dispersant composition of claim 1, wherein the molar ratio of (A) to (B) to (C) in the terpolymer is in a range of from about 2.5 to about 6 for (A), from about 1 to about 2 for (B), and from about 1 to about 3 for (C).

9. The dispersant composition of claim 1, wherein (A) is acrylic acid and (B) is an allyloxypolyethylene glycol sulfate ammonium salt.

* * * * *